June 30, 1964  H. M. RIVERS  3,139,071
BOILER SYSTEM
Filed March 14, 1960  6 Sheets-Sheet 3

INVENTOR.
HUBERT M. RIVERS
BY
William L. Krayer
ATTORNEY.

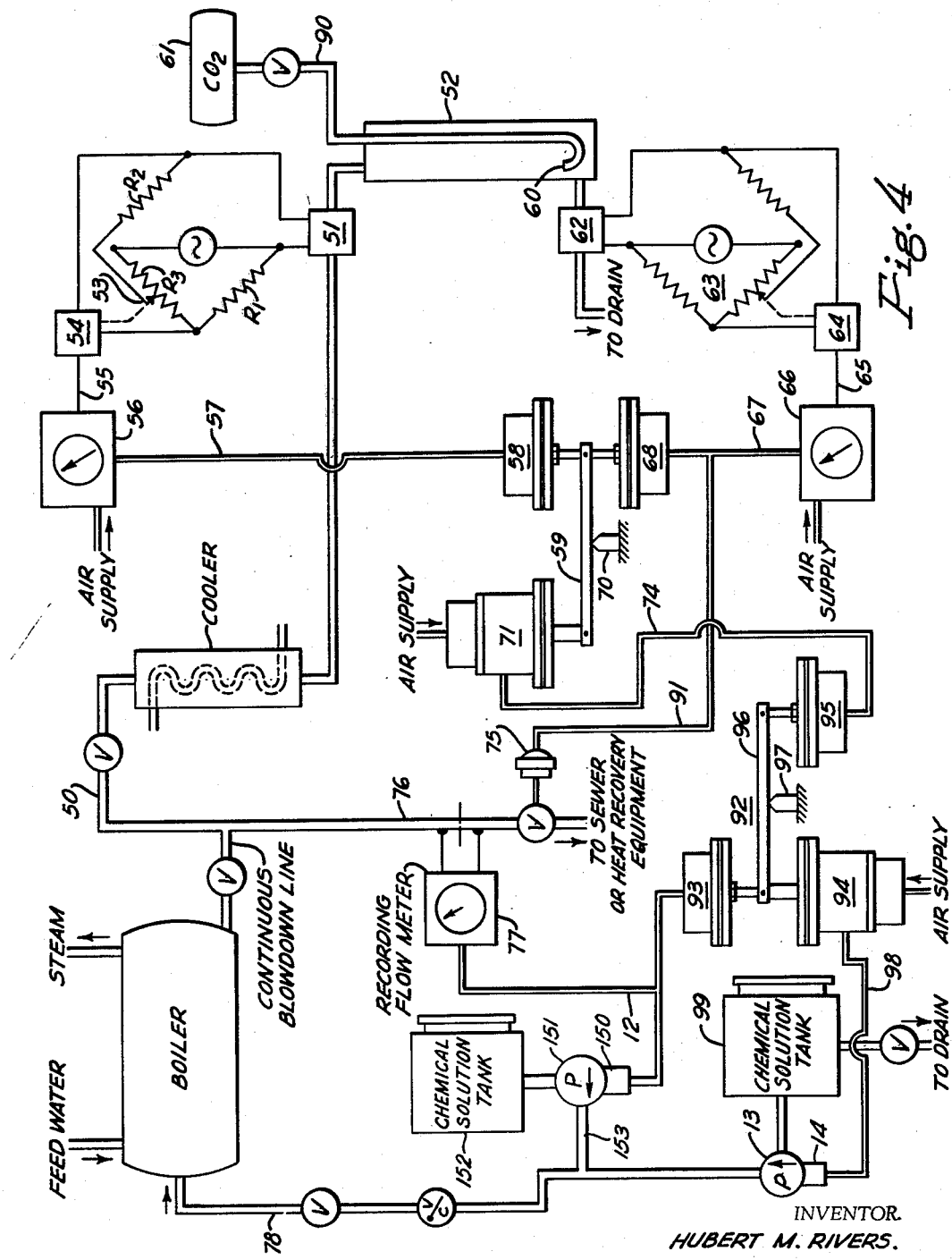

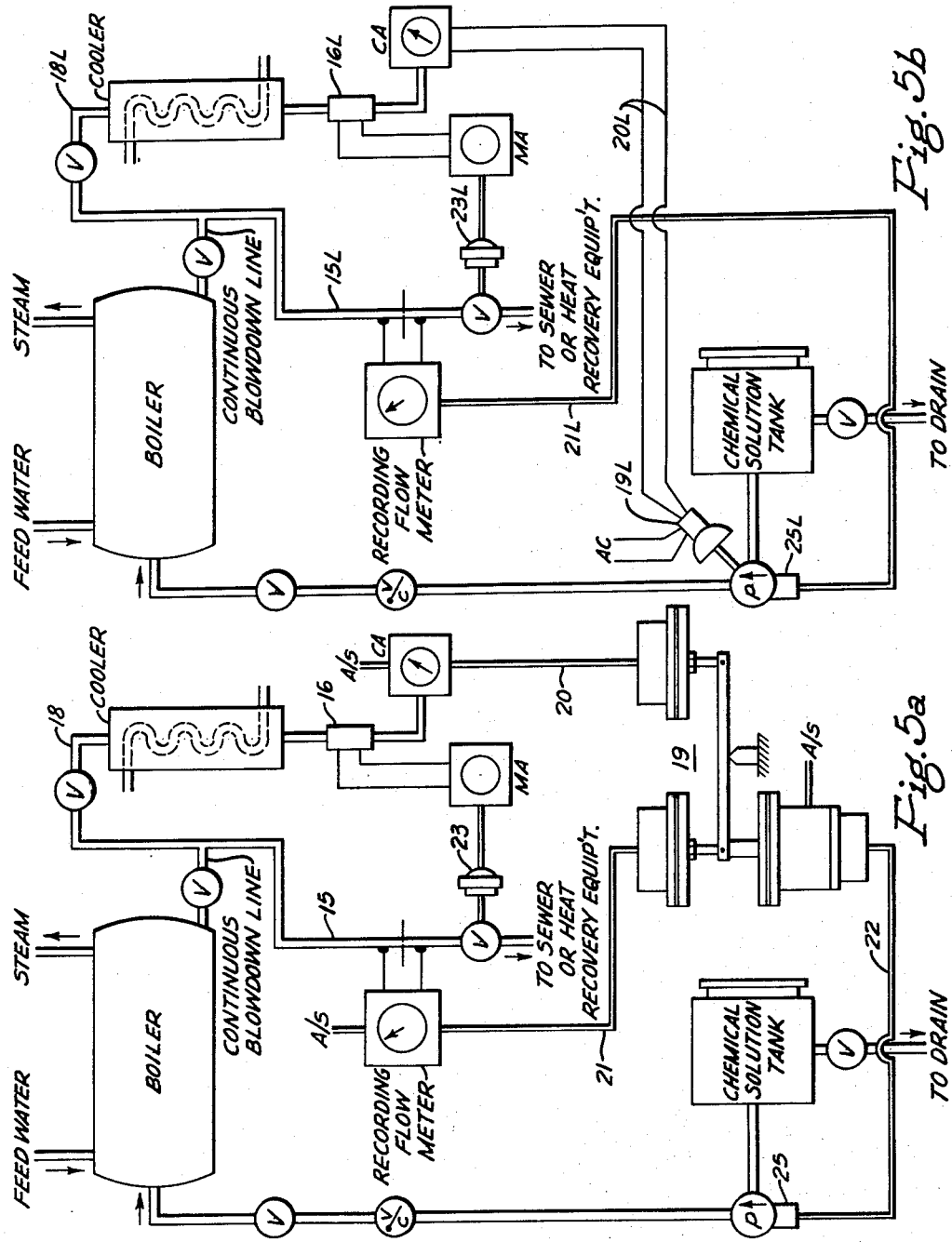

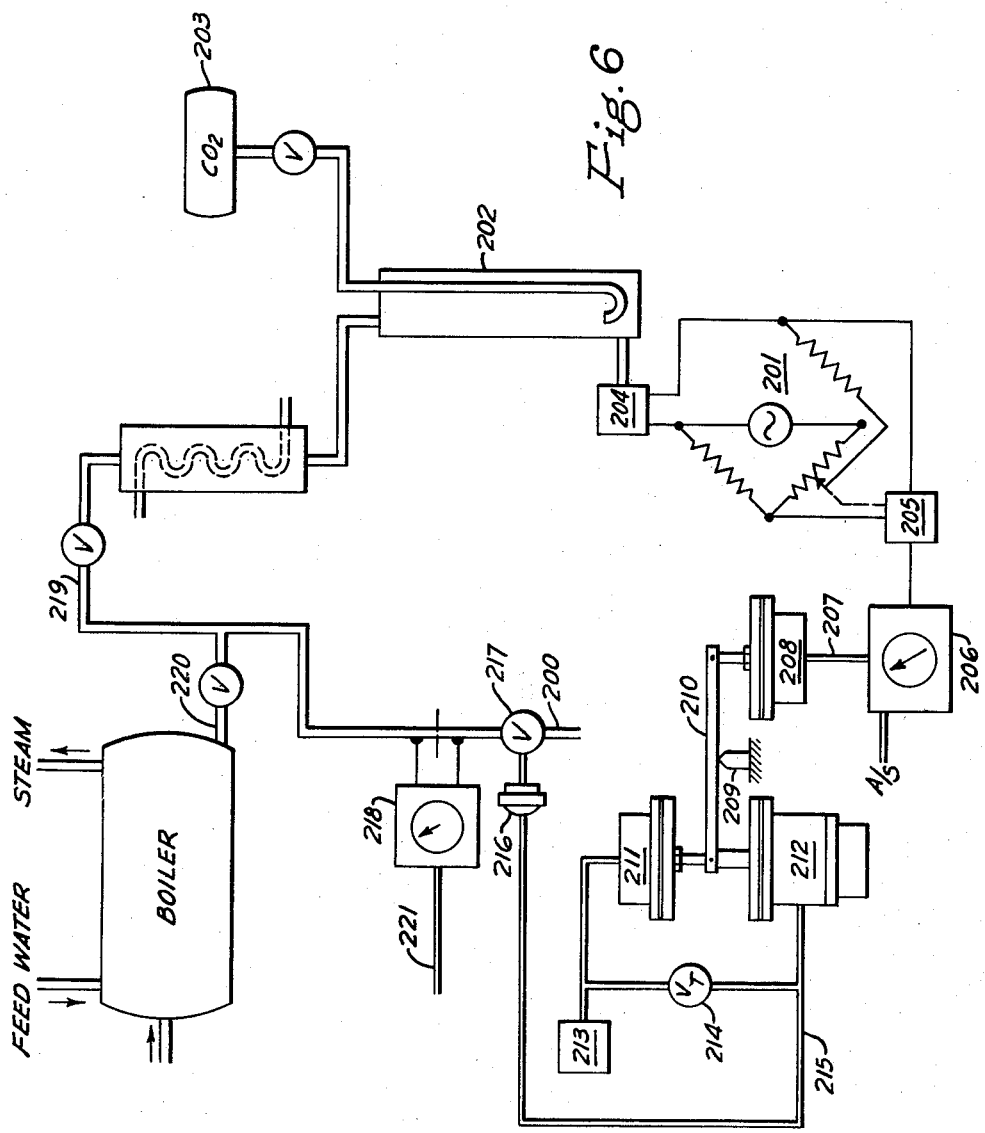

United States Patent Office 3,139,071
Patented June 30, 1964

3,139,071
BOILER SYSTEM
Hubert M. Rivers, Upper St. Clair Township, Allegheny County, Pa., assignor to Calgon Corporation, a corporation of Pennsylvania
Filed Mar. 14, 1960, Ser. No. 14,823
14 Claims. (Cl. 122—382)

This invention relates to the chemical treatment of boiler water.

The make-up water customarily provided for steam generating boilers contains a variety of naturally-occurring contaminants which, if not removed or counteracted, will create difficulties of boiler maintenance and operation. Calcium and magnesium hardness, for example, tend to form adherent deposits on boiler surfaces which greatly reduce their ability to pass heat; dissolved oxygen attacks boiler steel, producing corrosion in the form of pits; mineral solids left behind when water is converted to steam may sometimes concentrate sufficiently to create a foaming condition that causes boiler water to be entrained in the steam; etc. These properties of naturally-occurring contaminants in boiler feedwater are well known, as are also the hazards and the costs entailed by unscheduled outages, boiler repairs, chemical or mechanical boiler cleaning, and less efficient plant operation which result from improperly conditioned boiler water.

Some or all of the contaminants may be removed from the feedwater by chemical or mechanical means externally of the boilers. It has long been a general and widespread practice, however, to add to the boiler water one or more specific treating chemicals whose function is to obviate the costly or otherwise undesirable effects of contaminants in the boiler feedwater. For example, a soluble phosphate salt may be used to counteract the scale-forming tendencies of calcium and its compounds; soluble silicates are sometimes used to prevent deposition of adherent magnesium compounds; sodium sulfite may be used to remove corrosive dissolved oxygen; an organic dispersive agent may be employed to render precipitated sludges more fluid, thereby expediting their removal through boiler blowdown and minimizing their tendency to lodge on heat transfer surfaces; an antifoam agent may be used to minimize the entrainment of boiler water in steam; sodium nitrate may be fed as a safeguard against intercrystalline cracking of boiler steel; and so on. The use of such water conditioning chemicals is considered essential to safe and economical operation of most boiler plants throughout the world today.

Ordinarily, the amount of a specific chemical that must be fed in a given period of time is proportional to the input of a particular feedwater contaminant plus the quantity of treating chemical necessarily removed through blowdown during that time interval. If the contaminants that require treatment were introduced into the boiler at a constant rate, and if the rate of blowdown removal were also uniform, then the feeding of optimum amounts of treating chemicals would present no problem. In the vast majority of boilers, however, blowdown rates and contaminant input rates are subject to considerable variation, depending upon local operating conditions. This not only complicates greatly the task of feeding always the proper amounts of treating chemicals, but it also intensifies the need to maintain optimum control over boiler water chemical conditions at all times. If, for any reason, insufficient amounts of treating chemicals are fed, then scale deposition, corrosion, steam contamination, or other difficulties may result. On the other hand, should the dosage of treating chemicals materially exceed that required for proper conditioning of the boiler water, the excesses of treating chemicals may themselves promote objectionable deposits, corrosion, or steam contamination; and treatment costs will be unnecessarily high. Therefore, in order that proper concentrations be maintained in the boiler water at all times, the rate of chemical addition must vary systematically in relation to all changes in the rate of contaminant input and the rate of blowdown withdrawal.

Many circumstances of normal boiler plant operation may produce wide and often unpredictable variations in the rates of contaminant input and blowdown withdrawal. For example, when boiler make-up comes from a pond, stream or other surface water supply, its composition may fluctuate widely—rather gradually with changing seasons of the year or, sometimes, quite abruptly as a result of flash runoff. If the make-up is a mixture of well waters of different compositions, normal changes in the proportions of water from the various wells will naturally affect the composition of the make-up water mixture. In most boiler plants, the feedwater consists of treated or untreated make-up plus return condensate. Even when the boiler loading is steady, the proportion of return condensate in the feedwater may vary, directly influencing blowdown requirements as well as the rate of contaminant input. Boiler loading itself, being subject to variable demands for steam, most specifically influences the rates of contaminant input and blowdown which, in turn, determine the rate at which treating chemicals must be fed. All of the aforementioned variables affect the rate at which dissolved and suspended solids accumulate in the boiler. Blowdown rate must be varied accordingly so the total concentration of solids in the boiler water is maintained at some predetermined level consistent with economical and proper boiler performance; this fluctuation in blowdown rate produces, in turn, a corresponding change in the requirements for treating chemicals. In order for chemical treatment of the boiler water to be both effective and economical, variations in the rate of chemical addition must be accurately matched against variations in the rate of contaminant input to the boiler and the rate of blowdown withdrawal from the boiler.

At the present time, as for many years in the past, chemical additions are generally regulated according to chemical tests made periodically on samples of water taken from the boiler. A specified residual of each treating chemical must be maintained in the boiler water to provide assurance that the desired chemical reactions will proceed to completion. Overtreatment, on the other hand, is unnecessarily costly and may result in offensive deposits, corrosion, or steam contamination. If tests reveal that the residual concentration of a particular treating chemical is above or below the desired control range, the chemical addition is accordingly decreased or increased within the period until the next sample is taken and tested. The chemical feed is, of course, dependent upon the operator's ability to predict what the chemical requirements will be during the interval before samples are tested again. Such manual control of chemical additions is practical only when the rates of contaminant input and blowdown withdrawal can be anticipated with reasonable accuracy between successive sampling periods. Quite frequently, however, normal but unpredictable fluctuations in make-up water composition, percent make-up, and, particularly, boiler load create wide variations in blowdown demand and the rate of contaminant input, making it difficult for the operator to accurately anticipate chemical requirements between one sampling period and the next. In such cases, the operator must choose one or the other of two alternative courses of action, both of which are undesirable—either he must accept the hazards and the boiler maintenance and operating difficulties that come with irregularities in boiler water chemical control, or he must assume the additional cost and inconvenience of increasing the frequency of sampling and testing the boiler water and manually adjusting the chemical feed rate.

Prior to the present invention, various schemes have been employed whereby chemical additions are made in proportion to metered flow of steam, feedwater, or make-up water. All of these schemes embody various shortcomings which limit their applicability. For example, feeding chemicals in proportion to steam flow is practical only if the composition of the make-up water remains substantially constant while percent make-up and percent blowdown remain uniform; and these conditions are seldom, if ever, attained in practice. Chemical feed based on metered feedwater flow is uncertain because, with few exceptions, feedwater flow is not necessarily related to make-up water composition, percent make-up, or percent blowdown. Metered make-up water flow is a reliable basis for chemical feed proportioning only when the composition of the make-up water remains substantially constant while the blowdown rate bears a fixed relationship to make-up flow. Although the manual and automatic feed schemes employed in the past are capable of achieving satisfactory chemical control within specific and limited fields of applicability, none of them embodies the versatility and accuracy required for precise control over boiler water concentrations such as must be maintained in a great many contemporary steam generating plants.

I have invented a method and apparatus for maintaining proper boiler water chemical concentrations at all times regardless of variations in boiler load, blowdown rate, make-up rate, percent condensate in the feedwater, or concentration of total solids in the make-up water.

An object of the invention and all variations thereof described herein is to enable the maintenance in the boiler water of a desired concentration of boiler water treating chemical.

My invention provides that the required amounts of treating chemicals are fed in relation to blowdown while the blowdown is continuously regulated to maintain boiler water solids concentration at or near a predetermined level set for proper and economical boiler performance. By blowdown, I mean the water withdrawn from the boiler to remove contaminants introduced with the feedwater and concentrated in the boiler when water is evaporated to make steam. In effect, I feed treating chemicals in relation to the amounts of chemicals lost through blowdown, thereby maintaining the required precision of control over the desired boiler water concentrations. The chemicals may be fed into the make-up or feedwater lines or directly into the boiler.

A unique feature of my invention is the metering of blowdown water and feeding of treatment chemicals in relation to blowdown flow. I mentioned earlier that chemical requirements depend upon (1) the rate at which contaminants requiring treatment enter the boiler, and (2) the rate at which water is withdrawn from the boiler through blowdown. Any specific chemical employed to nullify the unwanted effects of a particular contaminant (such as, for example, the phosphate used to prevent deposition of calcium scale materials or the sodium sulfite used to prevent oxygen corrosion) must be fed in quantity sufficient to react with that amount of contaminant introduced into the boiler by the boiler feedwater. In addition, a specified excess of each treating chemical must be maintained in the boiler water to cause the desired chemical reactions to take place and proceed to completion. Since these residuals are present in the boiler water, active chemical thus removed from the boiler must be replaced by proper adjustment of the chemical feed rate. In substance, my invention provides that continuous blowdown flow is accurately metered by apparatus which provides an electrical or pneumatic signal by means of which the rate of chemical feed is varied in relation to blowdown flow.

Many boiler plants employ zeolite-softened, deionized, or evaporated make-up water. Because the concentration of contaminants is relatively constant in waters of this quality, chemical requirements are substantially equal to the loss of chemicals through blowdown. Here, by proportioning chemicals in accordance with blowdown flow, my invention provides a simple and straightforward means of maintaining materially improved control over concentrations of treating chemicals in the boiler water. Make-up water in some plants may be unsoftened and contain appreciable amounts of contaminants that require chemical treatment. Very frequently, however, the ratio of such contaminants to total solids in the unsoftened make-up water remains substantially constant over fairly long periods of time, even though the total solids concentration of the make-up water may fluctuate over a rather wide range. Since, in these cases, the contaminants requiring treatment bear this relationship to total solids introduced with the make-up water, and since these total solids ultimately govern the blowdown rate when blowdown is controlled to maintain a specified concentration of total solids in the boiler water, then metering of the blowdown water provides a direct indication of the amounts of chemicals required both to react with contaminants in the feedwater and to replace active chemicals lost through blowdown. Thus, my invention provides a new method for controlling chemical feed—the addition of water treating chemicals directly in relation to metered withdrawal of blowdown.

A feature which may be incorporated in my invention is the regulation of blowdown to maintain boiler water solids concentration at or near some predetermined point, the actual value of which will depend upon individual boiler design, steam purification facilities, steam pressure, and operating circumstances which neither affect nor are affected by the invention itself. In those cases where the rate of contaminant input is relatively steady over an appreciable period of time, blowdown may be controlled manually by means of a regulating valve in the continuous blowdown line. The appropriate setting of this valve may be determined by periodical manual tests to measure boiler water solids directly or to measure some constituent or electrical conductivity, whose relationship to total solids concentration is known and relatively constant. When blowdown rate is regulated so as to control the concentration of some boiler water constituent that bears a constant relationship to boiler water solids concentration, indirect but nevertheless effective control over solids concentration in the boiler water is achieved. Such blowdown control may be accomplished automatically by means of continuous conductivity measuring controlling equipment, which equipment is already known in the art. When measured accurately by means of appropriate apparatus, the electrical conductivity of boiler water is approximately proportional to the concentration of dissolved solids. This proportionality factor may vary somewhat from one plant to the next but remains substantially constant in most individual boiler installations.

In those relatively few cases where hydroxides comprise an appreciable and variable percentage of the boiler water solids, it may be necessary to neutralize the continuously flowing sample prior to conductivity measurement. Where this is the case, neutralization of the hydroxyl ion to provide accurate measurement of dissolved solids concentration may be accomplished by a method such as that described in the patent application of Kaufman et al., S.N. 620,656, entitled "Method of and Apparatus for Controlling the Concentration of Dissolved Solids in Steam Boiler Water," now U.S. Patent No. 2,964,024. Experience has amply proven that conductivity measurement provides a trustworthy basis for estimating boiler water solids concentrations. Therefore, apparatus for measuring the conductivity of a continuously flowing sample can be employed to generate an electrical, pneumatic, or other loading signal proportional to boiler water solids concentration. This signal then can serve to open or close a continuous blowdown regulating valve so as to hold boiler water solids concentration within the desired range, regardless of variations in boiler load, percent make-up, or concentration of solids in the make-up water or in the feedwater.

In those relatively rare instances where variations in alkalinity (that is, the total bicarbonate, carbonate, and/or hydroxide) may significantly affect chemical control, my invention may employ one or more continuous analyzers to measure the alkalinity in the boiler water. For example, a variation in the ratio of alkaline constituents to total solids in the make-up water may call for specific adjustment in the feed rate of (1) an alkaline treating chemical such as soda ash or caustic soda, (2) a moderately alkaline chemical such as disodium orthophosphate, or (3) an alkali reducing material such as monosodium orthophosphate or sodium acid sulfate. In order to achieve materially improved control over boiler water alkalinity, I measure continuously the conductivity of a flowing sample before and after neutralization by continuous addition of carbon dioxide gas in a suitable reaction chamber. The difference between these two conductivity values is a measure of boiler water alkalinity concentration. One of several available methods is used to generate an electrical, pneumatic or other indexing signal corresponding to the difference between the conductivity readings obtained before and after neutralization; this indexing signal is then incorporated with the blowdown flow meter signal which activates the appropriate chemical feeder. In this way, the amount of alkali-controlling chemical fed per unit quantity of blowdown water removed is increased or decreased, as required, so that boiler water alkalinity (i.e., the difference between conductivity measurements made on neutralized and unneutralized boiler water) is maintained within a predetermined control range.

In those instances where boiler make-up is softened, deionized or evaporated, the amount of phosphate chemical required to prevent deposition of calcium scale materials is substantially equal to or only moderately greater than that required to replace phosphate chemical lost through blowdown; such boiler plants will be able to maintain very close control over boiler water phosphate concentration simply by feeding the phosphate chemical in direct proportion to metered continuous blowdown flow. There will be some installations, however, where the ratio of calcium to total solids in the make-up water or in the feedwater may vary significantly during relatively short intervals of time. Such variations in the ratio of calcium to total solids may cause an undesirable amount of fluctuation in boiler water phosphate concentration when phosphate treating chemical is fed strictly in proportion to blowdown flow rate and when blowdown is regulated to maintain boiler water solids concentration at some predetermined level. Should circumstances warrant the elaboration, my invention incorporates a continuous phosphate analyzer capable of generating an electrical or pneumatic indexing signal which is directly correlated to boiler water phosphate concentration. This phosphate-correlated indexing signal effects a biasing of the blowdown meter output signal which activates the phosphate feeder; thus, the amount of phosphate chemical fed per unit quantity of blowdown is varied as required to hold boiler water phosphate concentration within desired limits independently of variations in the ratio of calcium to total solids in the make-up water (or in the feedwater). Similar means can be employed for controlling the addition of treating chemicals other than phosphate. Apparatus which is more than adequate for continuously determining the quantity of phosphate, silicate, or other chemicals in boiler water is disclosed in the patent application of Luppold and Stough, S.N. 861,589, dated December 23, 1959, entitled "Apparatus for Continuous Analysis of Solutions and Gases," which is assigned to the asignee herein. An automatic continuous photoelectric colorimeter may be constructed according to the teachings therein. An automatic continuous photoelectric colorimeter such as that referred to above may be made to generate an indexing signal which is a function of the concentration of the particular chemical being tested for, as disclosed in the above-mentioned patent application. This signal may, as mentioned above, be used to bias the signal emitted by the blowdown flow meter which controls the phosphate feed. The signal representing phosphate may also be used in some circumstances to bias the blowdown valve control.

Such a photoelectric colorimeter may similarly be set up to measure the concentration of a constituent of the boiler water whose relation to the total solids concentration is known to be substantially constant. Where this is done, the colorimetric apparatus may take the place of the conductivity meter in my invention. That is, an automatic continuous colorimeter may be attached to sample the blowdown conduit, the continuous sample continuously treated with the proper reagent (or reagents) and passed through the sample cell, and the signal generated by the colorimeter used either before or after linearization to control the blowdown valve.

Such a photoelectric colorimeter may replace the conductivity meter entirely. Circumstances may warrant the control of blowdown based solely on continuous silica determinations, for example. Thus, the colorimeter may generate an electrical, pneumatic, or other control signal representative of the silica concentration in the boiler water, and this signal may be used alone to regulate the blowdown control valve.

FIG. 4 is a more or less diagrammatic illustration of a variation of my invention in which the conductivity of the boiler water after neutralization is used to regulate blowdown and blowdown flow biased by the difference in conductivity before and after neutralization is used to regulate chemical feed.

FIG. 5a is a more or less diagrammatic illustration of blowdown regulated by conductivity while chemical feed is biased by the concentration of one chemical constituent of the boiler water as measured by a continuous colorimeter.

FIG. 5b illustrates the system of 5a except that the biasing action is accomplished by a pump stroke control rather than a pneumatic system.

FIG. 6 is a more or less diagrammatic illustration of blowdown regulated by conductivity in which the blowdown control signal is subject to reset action.

Figure 1:
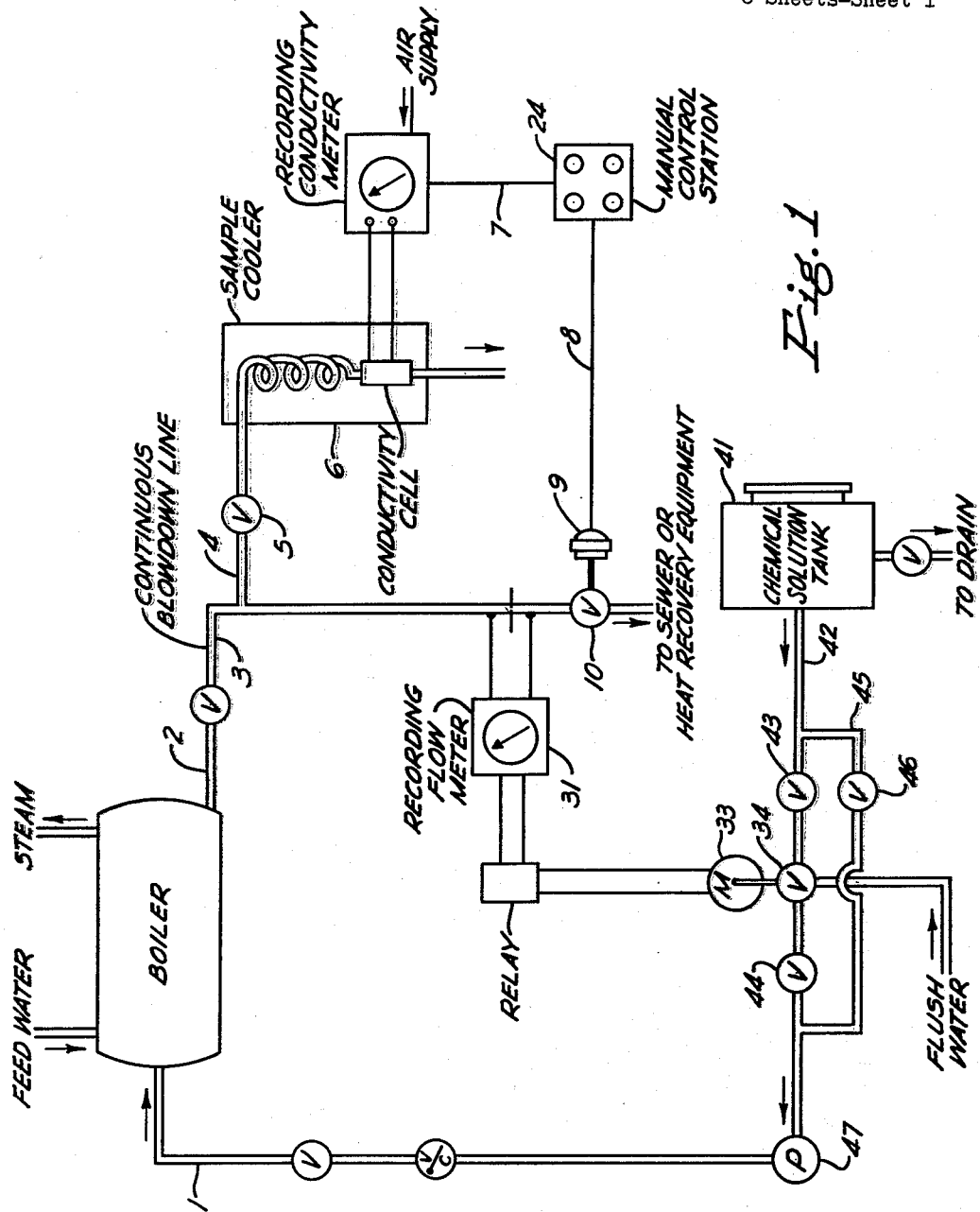
FIGURE 1 is a more or less diagrammatic illustration of a presently preferred form of my apparatus invention as applied to a single boiler.

A purely illustrative embodiment of my invention is shown in more or less diagrammatic fashion in FIGURE 1. The boiler is provided with an inlet for feedwater, an inlet 1 for treating chemical solution, an outlet for steam and an outlet 2 for blowdown. On the blowdown conduit 3 is attached a sampling line 4 which may have a valve 5 controlling flow of the sample through cooling means 6 and into the conductivity cell. Conductivity readings taken in the conductivity cell are controlled and recorded by the conductivity meter. The conductivity meter generates a pneumatic signal which signal is a function of the conductivity. This pneumatic signal is transmitted through line 7 to a manual control station, which in turn emits a signal through line 8 to the control 9 for blowdown valve 10.

Flow meter 31 is located on the blowdown conduit. It generates a signal as a function of blowdown flow which signal is transmitted to the relay and motor 33 which operates valve 34 on the chemical feed line.

A chemical solution tank 41 is provided with an outlet 42 leading through valve 43, valve 34, and valve 44. Bypass 45 is provided with valve 46. Pump 47 is also provided on the line leading to inlet 1 of the boiler. Valve 34 permits either chemical solution or flush water to pass to pump 47. Pump 47, in this preferred arrangement, operates constantly.

Boiler water level control, feedwater control, fuel control and the like are, of course, not shown. Although they each affect the operation of my invention, compensation for each is entirely independent of any direct measurement. Obviously, as the demand for steam increases, fuel input is increased to maintain steam pressure, the water level in the boiler tends to recede, calling for addition of more feedwater. Contaminants introduced with the feedwater become concentrated by conversion of water to steam; the resulting increase in boiler water conductivity is sensed by the conductivity-measuring device, which then causes the blowdown and chemical feed controllers to respond appropriately.

Referring again to FIG. 1, a sample of boiler water is fed, preferably continuously, from the blowdown line 3 into the conductivity cell. The conductivity meter generates a signal which may be pneumatic, electrical, or any other practical control signal proportional to the conductivity of the blowdown water. Indeed, any of the signals represented as pneumatic in this specification may as well be electrical or any other suitable signal. Conversely, an electric control signal may as well be pneumatic. Since the water in the blowdown line contains the same concentration of dissolved solids as the water in the boiler and since the conductivity of a solution of solids is proportional to their concentration, the signal thus generated will be a function of the concentration of dissolved solids in the boiler water. Set point and/or biasing means will preferably be provided in the same housing as the conductivity recorder.

Manual control station 24 provides means for manual control of the blowdown valve. When it is not set at manual, the signal proceeds without interruption to control 9 for blowdown valve 10. Preferably, the system will provide continuous blowdown although the blowdown will vary, of course, depending on the conductivity of the boiler water.

Although any standard conductivity cell, conductivity meter and signal generating apparatus will be satisfactory, I prefer to use the "PowrLog" Model H-O conductivity apparatus described in Specification Sheet OE-10004 of Hagan Chemicals & Controls, Inc.

Referring again to FIG. 1, recording flow meter 31 measures the amount of blowdown and transmits a signal, either pneumatic or electrical, preferably proportional thereto. The signal is received by the motor control for valve 34 on the chemical feed line, thus controlling the flow of treating chemical into the boiler.

Figure 3:
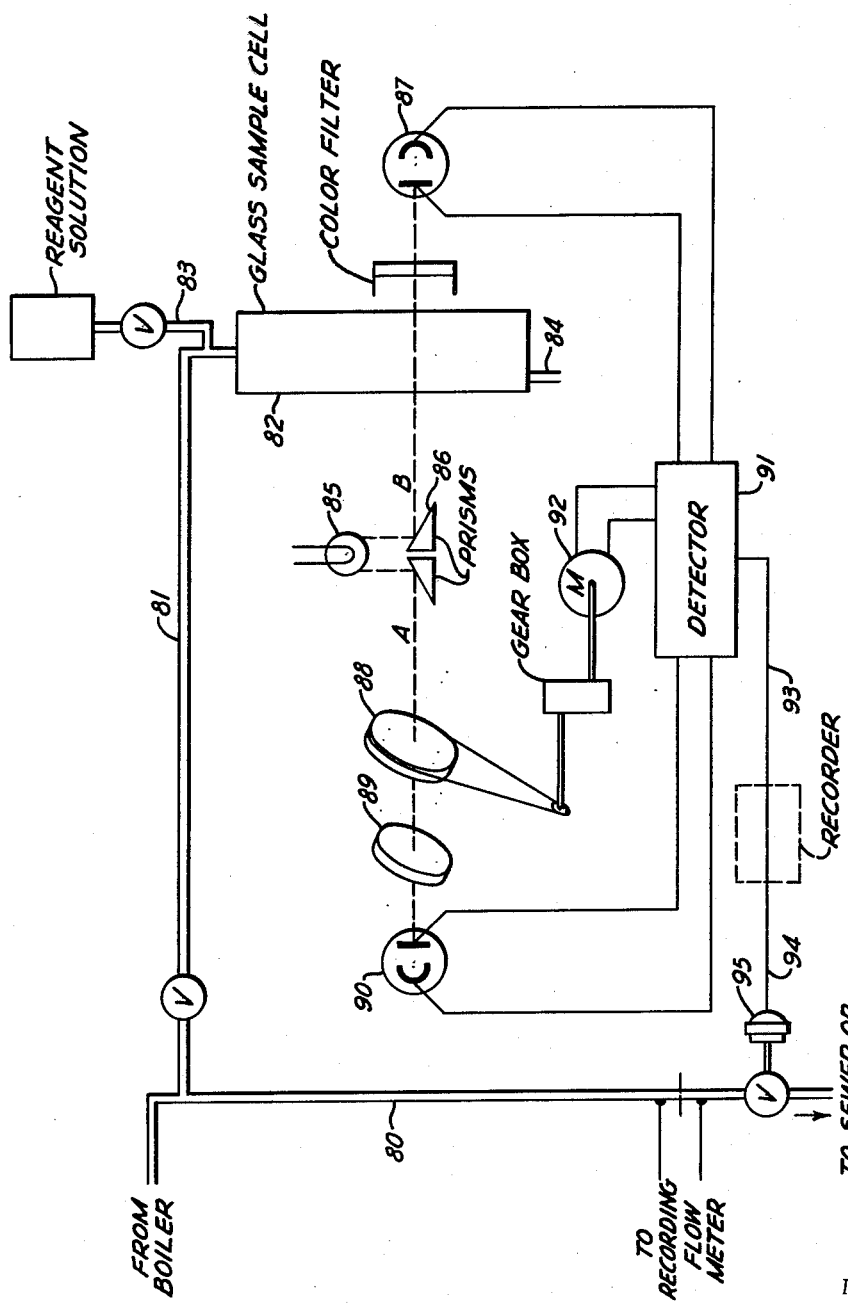
FIG. 3 is a more or less diagrammatic illustration of a continuous colorimetric analyzer as applied to a boiler water sample and its use to control blowdown flow.

In FIG. 3, blowdown conduit 80 includes a flow control valve 95 and a flowmeter orifice. A sample line 81 carries a preferably continuous sample to sample cell 82, while the proper reagent is mixed with the sample through line 83. Sample cell 82 contains drain 84 and is preferably of a type which will continuously replace its contents rather than permit still pockets to accumulate. Color of the sample in the sample cell varies according to the proportion of the reagent in it and the concentration of test component. A light source 85 directs light through prisms 86. The light in path B passes through a sample cell 82 and a color filter to photocell 87. The light in path A passes through rotatable polarizing disc 88 and stationary polarizing disc 89 to photocell 90. Photocells 87 and 90 are connected to detector 91 which detects a difference therein which may be developed by a difference in the strengths of the light beams striking the respective photocells. When such a difference exists, a control output of detector 91 operates motor 92 which, through a gear box, rotates polarizing disc 88 to rebalance the strengths of the light beams. An indication or recording of the analysis may be taken from the position of polarizing disc 88 or from line 93 which carries an output signal from the detector to valve 95 to regulate the blowdown. Detector 91 may be any of many commercially available voltage difference detectors well known in the art.

Of course, the continuous analyzer just described is only one of many types of analyzers which may be substituted for the conductivity meter. Any device capable of generating a signal representative of the concentration of a constituent of the boiler water may be substituted.

In FIG. 4, a variation of my invention is illustrated in which the conductivity after neutralization is used to control blowdown. The boiler water sample in line 50 is passed through the cooler conductivity cell 51, thence through neutraliizng cylinder 52 through which $CO_2$ gas from cylinder 61 is bubbled. Conductivity cell 51 forms one arm of a Wheatstone bridge circuit comprising resistances $R_1$ and $R_2$ ($R_2$ may be a temperature-compensating resistance) and a slidewire $R_3$. Because the slidewire is opposite the conductivity cell on the bridge, the position of wiper arm 53 on the slidewire when the bridge is balanced is directly proportional to the conductivity. Device 54 is a differential detecting amplifier together with a motor energized thereby for moving the wiper arm to balance the bridge. A signal representing the position of the wiper arm is transmitted through line 55 to conductivity recorder 56 which records the conductivity on a linear chart. An air supply is introduced to the recorder and a signal is generated in the conventional manner proportional to pen position and transmitted through line 57 to dead-end diaphragm chamber 58 of a pneumatic ratio totalizer resting on fulcrum 70. The counterclockwise force exerted by diaphragm chamber 58 on beam 59 is thus proportional to conductivity of the boiler water prior to neutralization.

The sample in cylinder 52 is neutralized by $CO_2$ gas which is emitted at 60 from a tube 90 connected to tank 61. The neutralized sample is continuously run through conductivity cell 62 and then drained. Circuit 63 is a conductivity meter identical to that operating on conductivity cell 51. The conventional self-balancing amplifier, gear train, and motor shown in block form at 64 transmits an electrical signal through line 65 to conductivity recorder 66, which records the conductivity after neutralization. Air from an air supply is converted by conventional means to a pneumatic pressure signal proportional to the neutralized conductivity, and this signal is transmitted through conduit 67 to dead-end diaphragm chamber 68 on beam 59. Beam 59 is mounted on fulcrum 70 and also supports pneumatic signal generator 71. Such a force-balance device is known in the art as a ratio totalizer, an example of which is the ratio totalizer manufactured by Hagan Controls Corporation and described in its Bulletin MSP-120. Pneumatic signal generator 71 has an air supply which it converts to a pneumatic pressure acting on a diaphragm with a force equal and opposite to that opposing it. The signal generator's output signal in line 74 is equal to the difference between the pressures in chambers 58 and 68, as is known in the control art.

The neutralized conductivity signal is also conducted from line 67 to line 91 where it opens valve 75 more or less depending on its value, and the blowdown flow in conduit 76 is measured and recorded in meter 77 as in FIG. 1.

The flow meter reading is converted in the meter in the conventional manner to a proportional pneumatic pressure signal and transmitted through line 12 to dead-end diaphragm chamber 93 of ratio totalizer 92. The output of signal generator 71, representing the difference in conductivity before and after neutralization, is sent through line 74 to dead-end diaphragm chamber 95. The pressures in chambers 93 and 95 both tend to rotate beam 96 counterclockwise on fulcrum 97, the total force of which is met by an opposite and equal force in signal generator 94 which is similar to signal generator 71. The output of signal generator 94 is transmitted to pump 13 which includes a stroke control device 14 operated by the varying pressure in line 98. Pump 13 will deliver chemical solution from source 99 through line 78 to the boiler at a rate which is a function of the sum of the blowdown flow rate and the difference in conductivity of a sample before and after neutralization. An example of a pump 13 having a stroke control 14 is the "Conomotor" sold by Conoflow Corporation, Philadelphia, Pennsylvania. Chemical solution in tank 99 may be for example, an alkali-neutralizing chemical such as sodium acid sulfate. If it is desired to maintain a predetermined conductivity differential by feeding an alkaline material such as sodium hydroxide, the position of chamber 95 may be reversed (i.e. placed on top of the beam) to subtract from the flow signal in chamber 93. A constant force may be applied to beam 59 to represent the predetermined alkalinity if desired.

Line 12 also carries the blowdown flow signal from flowmeter 77 to pump control 150 for chemical feed pump 151 which may feed a water treating chemical solution such as phosphate from chemical solution tank 152 through conduit 153 to conduit 78 leading to the boiler. Thus it is seen that a desired concentration of phosphate or other boiler water treating chemical may be maintained in the boiler by continuously replacing that portion of the chemical lost through blowdown by using means for feeding water treating chemical in response to blowdown, and at the same time a pH adjustment may be made through the use of means for measuring alkalinity by subtracting a signal representing neutralized conductivity of the boiler water from one representing un-neutralized conductivity thereof, adding this signal to one representing blowdown flow, and using the result to control the feed of pH-adjusting chemical.

In FIG. 5a, the blowdown line 15 is tapped by sample line 18 which conducts a cooled sample to conductivity cell 16 and to continuous colorimetric analyzer CA. Conductivity meter MA regulates blowdown valve 23 in the same manner as explained elsewhere. The output of analyzer CA, representing the concentration of the constituent of the boiler water which was determined, is transmitted by line 20 to totalizer 19. The output of a flowmeter on the blowdown line is transmitted through line 21 to exert a force on the totalizer in opposition to that of the analyzer output. The output of totalizer 19 is transmitted through line 22 to regulate the chemical feed solution pump 25. Thus, it may be seen that the blowdown is regulated by conductivity of the boiler water, and the chemical feed is regulated by blowdown flow biased by the concentration of a particular constituent of the boiler water. For example, if the chemical feed solution is metaphosphate, the feed will be equal to that necessary to replace the phosphate lost through blowdown less an amount based on the concentration of phosphate already present in the water. More or less effect can be given to the bias factor from the colorimetric analyzer by proportionally adjusting its output signal or changing the position of the fulcrum in totalizer 19.

FIG. 5b illustrates a configuration similar to FIG. 5a, including a blowdown conduit 15L, sample line 18L, conductivity cell 16L, conductivity meter MA, continuous colorimetric analyzer CA, and flowmeter output line 21L. Biasing is accomplished in a different manner, however. The signal representing blowdown flow is transmitted to the stroke control 25L of the feed pump, while the output of the analyzer, in this case an electrical signal generated in the conventional manner, is transmitted to speed control 19L of the feed pump. Thus, the length of the stroke of the pump is controlled by blowdown while its speed is controlled, for example, by phosphate concentration. A pump easily adaptable to service in this situation is the General Electric "Thymotrol" D.C. pump. Where pneumatic speed control is desired, the pneumatic speed control described in Bulletin 6000 of Graham Transmissions, Inc., may be used.

In FIG. 6, a simplified system is shown which includes the use of reset, i.e. integration, on the blowdown control signal. Water from the boiler is passed through the blowdown conduit 220 through valve 217 to drain 200. It is sampled by sampling tube 219, passed through a cooler and into cylinder 202 where it is neutralized by $CO_2$ gas from cylinder 203. It then passes into conductivity cell 204 and conductivity meter 201 operates as described elsewhere resulting in an output signal from detector 205, which is sent to recorder 206. The signal is converted in the conventional manner by recorder 206 to a pneumatic signal which is transmitted through line 207 to dead-end diaphragm chamber of a totalizer having a beam 210 and fulcrum 209. A counterclockwise force exerted by the pressure in chamber 208 is met by an equal force in the opposite direction generated by signal generator 212 as elsewhere described. However, the output signal is provided with a reset line which includes needle valve 214 and volume tank 213. The line is connected to dead-end diaphragm chamber 211. Thus, it will be seen that the output signal, modified by the constant factors introduced through the needle valve and volume tank, is reimposed upon itself and will continue to increase until dead-end chamber 208 returns to zero. Of course, it may not be desirable for a signal of zero in chamber 208 to represent zero conductivity. Compensation may be made by a dead-end diaphragm bias such as shown in FIG. 5a, having a constant input pressure or by any other of the methods well known in the art for inserting a bias in the totalizer, the electro-pneumatic converter, or the conductivity meter itself. As is well known in the control art, the integrated signal will increase to deliver whatever value is necessary to return the conductivity to the desired value.

In summary, it can be seen that the apparatus disclosed provides one means for carrying out my complete method of boiler control which comprises removing blowdown water from the boiler in response to a signal representing the conductivity of the blowdown water, and adding treatment chemical to the feedwater or to the boiler water at a rate proportional to the blowdown.

Although the chemical feed is, in my invention, directly related to the amount of blowdown, it is only over a period of time that it is proportional to the conductivity of the blowdown water. This is because the blowdown valve may be subject to reset or rate action which would momentarily activate it out of proportion to the conductivity.

The effect of reset action is that the signal operating the blowdown valve is increased in regular increments if the initial control signal operating the blowdown valve does not soon correct the conductivity. Thus, the blowdown valve may become wide open although the conductivity is only slightly above the set point. The signal controlling chemical feed, then, will not be directly proportional to the conductivity at this point. Rate action may produce a similar result. On the other hand, in boilers having relatively large water storage capacity, momentary changes in load or in the rate of contaminant input may affect the boiler water conductivity so slowly that simple proportional band control will suffice; in such cases, blowdown and chemical feed rates will be directly proportional to the prevailing conductivity.

It may be mentioned here that some chemical feeders do not operate continuously even where the signal continuously calls for chemical treatment. Rather, a commonly used feeder feeds intermittently on counting a predetermined number of pulses generated by the governing signal. Either continuous or intermittent injectors may be used in my invention.

Figure 2:
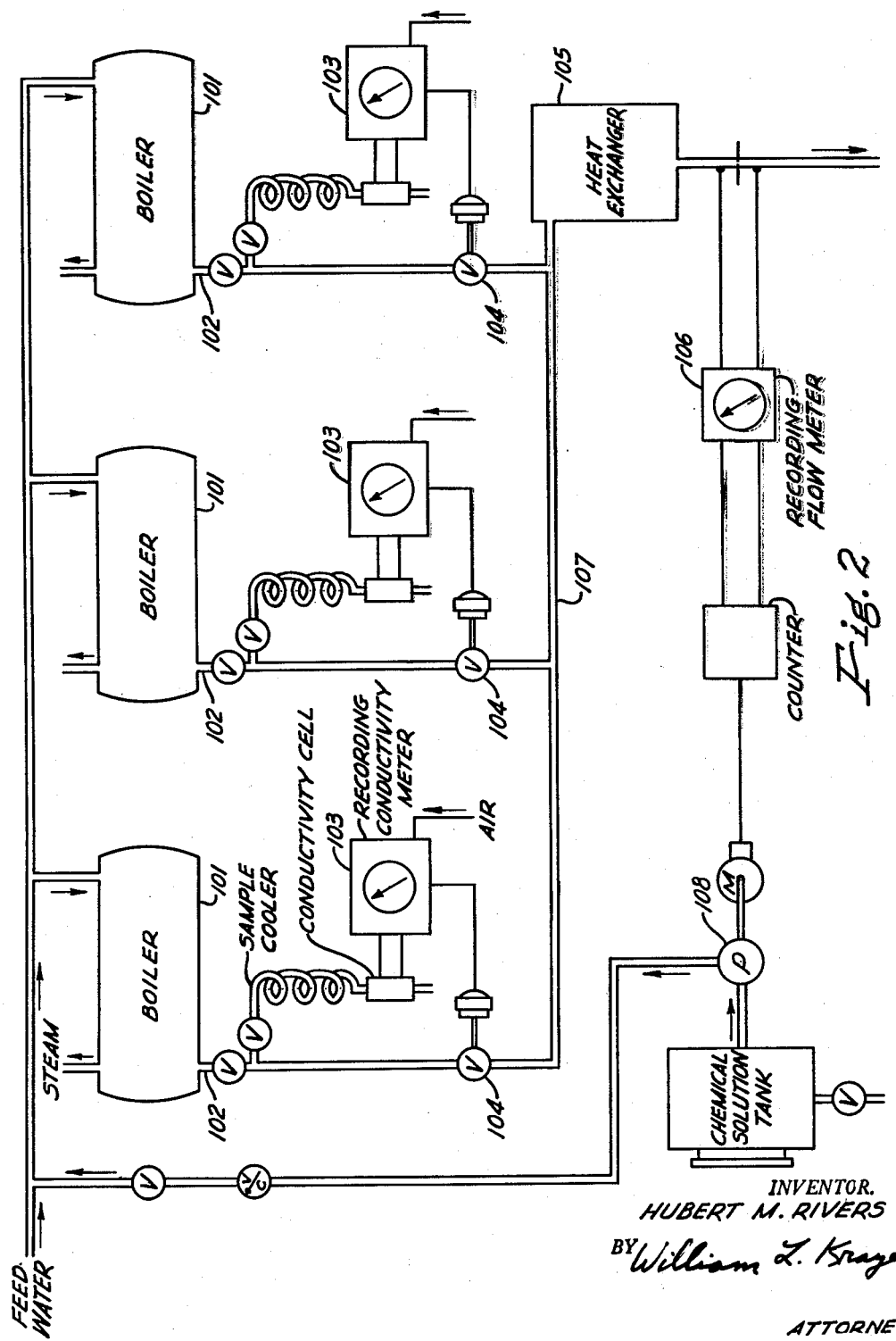
FIG. 2 is a more or less diagrammatic illustration of a presently preferred form of my apparatus invention as applied to a unit of three boilers.

My invention is readily adaptable to the control of a battery of boilers as illustrated in FIG. 2. Operation of the illustrative system shown in more or less diagrammatic fashion in FIG. 2 may be explained along with the physical description as follows: Boilers 101 each have blowdown outlets 102 on which conductivity meters 103 are attached in the same manner as shown in more detail in FIG. 1. The signals generated by the conductivity meters 103 are used to control blowdown valves 104 in the manner previously described. The blowdown enters a common conduit 107 and after passing through heat recovery apparatus 105, is metered. Flow meter 106 generates a signal proportional to the combined blowdown and transmits it to chemical feed control 108 located on the common feedwater line. Thus, it will be seen that if Boiler "A" is producing more steam than the others, its water will become more concentrated with solids, causing the conductivity and consequently the rate of blowdown to increase. This in turn will cause the flow meter to call for more treatment chemicals to be fed into the feedwater. Since more feedwater will be entering Boiler "A" than the others, it will receive a proportionately higher amount of treating chemicals. The feedwater controls are, of course, not shown.

While I have shown and described certain present preferred embodiments of my invention and have illustrated certain present preferred methods of practicing the same, it is to be distinctly understood that the invention is not limited thereto but may be otherwise variously embodied and practiced within the scope of the following claims.

I claim:
1. Boiler apparatus comprising means for regulating blowdown to maintain the concentration of at least one constituent of the boiler water within predetermined limits, and means for feeding water-treating chemical into the boiler in direct response to blowdown flow to maintain a desired concentration of water-treating chemical.
2. Boiler apparatus comprising means for regulating blowdown to maintain the concentration of at least one constituent of dissolved solids in the boiler water within predetermined limits, means for generating a control signal primarily representative of blowdown flow, and means for feeding water-treating chemical into the boiler in direct response to said signal to maintain a desired concentration of water-treating chemical.
3. Boiler apparatus comprising:
(a) means for regulating blowdown to maintain the concentration of at least one constituent of dissolved solids in the boiler water within predetermined limits;
(b) blowdown flow measuring means including means for generating a control signal representative of the blowdown flow measurement; and
(c) means for receiving said signal and feeding water-treating chemical into the boiler in direct response thereto to maintain a desired concentration of water-treating chemical.
4. Boiler apparatus comprising means for regulating blowdown to maintain the conductivity of the boiler water within predetermined limits, and means for feeding water-treating chemical into the boiler in direct response to blowdown flow to maintain a desired concentration of water-treating chemical.
5. Boiler apparatus comprising means for regulating blowdown to maintain the conductivity of the boiler water within predetermined limits, means for generating a control signal primarily representative of blowdown flow, and means for feeding water-treating chemical into the boiler in direct response to said signal to maintain a desired concentration of water-treating chemical.
6. Boiler apparatus comprising:
(a) means in contact with boiler water for measuring the conductivity thereof and generating a first control signal representative of said condutcivity;
(b) valve means responsive to said first control signal for controlling blowdown flow;
(c) blowdown flow measuring means including means for generating a second control signal representative of said blowdown flow; and
(d) means for feeding water-treating chemical to the boiler in response to said second control signal to maintain a desired concentration of water-treating chemical.
7. Boiler apparatus comprising:
(a) means for sampling the boiler water;
(b) means for neutralizing a boiler water sample in said sampling means by passing $CO_2$ through it;
(c) means for measuring the conductivity of a sample thus neutralized and generating a first control signal representative of said conductivity;
(d) means for receiving said first control signal and regulating blowdown in response thereto;
(e) blowdown flow measuring means including means for generating a second control signal representative of the blowdown flow measurement; and
(f) means for feeding water-treating chemical into the boiler in response to said second control signal.
8. Boiler apparatus comprising:
(a) means for measuring conductivity of the boiler water and generating a first control signal representative thereof;
(b) boiler water sampling means;
(c) means in operating relation with said sampling means for neutralizing a boiler water sample by passing $CO_2$ through it;
(d) means for measuring the conductivity of a sample thus neutralized and generating a second control signal representative thereof;
(e) means responsive to said second control signal for regulating blowdown;
(f) means for measuring blowdown flow and generating a third control signal representative thereof;
(g) means for feeding water-treating chemical in response to said third control signal to maintain a desired concentration of water-treating chemical;
(h) means for subtracting said second control signal from said first control signal and generating an analog signal proportional to the difference thereof; and
(i) means for feeding pH adjusting chemical in response to said analog signal to maintain the desired pH.
9. Boiler water control system for a plurality of boilers having a common water source comprising means for regulating the blowdown of each boiler to maintain the concentration of at least one constituent of the boiler water within predetermined limits, means for measuring total blowdown and generating a control signal representative thereof, and means for feeding water-treating chemical to said common water source in direct response to said signal to maintain a desired concentration of water-treating chemical.
10. Method of treating boiler water comprising regulating blowdown to maintain the concentration of at least one constituent of the boiler water within predetermined limits, and regulating water-treating chemical feed in direct response to blowdown flow to maintain a desired concentration of water-treating chemical.
11. Method of treating boiler water comprising measuring the conductivity of the boiler water, regulating blowdown by said conductivity, measuring blowdown flow, and regulating the rate of addition of boiler water treating chemical to the boiler by blowdown flow to maintain a desired concentration of water-treating chemical.
12. Method of treating boiler water in a plurality of boilers having a common water source comprising regulating the blowdown of each boiler to maintain the concen- tration of at least one constituent thereof within predetermined limits, and regulating the addition of water-treating chemical to said common water source in direct response to total blowdown flow to maintain a desired concentration of water-treating chemical.

13. Boiler apparatus comprising means for regulating blowdown to maintain the conductivity of the boiler water within predetermined limits, means for generating a control signal representative of the concentration of a constituent of the boiler water, and means biased by said control signal for feeding water treating chemical into the boiler in direct response to blowdown flow to maintain a desired concentration of water-treating chemical.

14. Boiler apparatus comprising:
(a) sampling means for sampling boiler water,
(b) means for neutralizing a boiler water sample obtained from said sampling means,
(c) means for measuring the conductivity of a neutralized sample and generating a first control signal representative of said conductivity,
(d) means for receiving said first control signal and regulating blowdown in response thereto,
(e) blowdown flow measuring means including means for generating a second control signal representative of the blowdown flow measurement, and
(f) means for feeding water-treating chemical into the boiler in direct response to said second control signal.

References Cited in the file of this patent
UNITED STATES PATENTS

| | | |
|---|---|---|
| 1,484,073 | Morrison | Feb. 19, 1924 |
| 1,766,622 | Frey | June 24, 1930 |
| 1,895,635 | McDonald | Jan. 31, 1933 |
| 1,898,209 | Parker | Feb. 21, 1933 |
| 1,913,195 | Donaldson et al. | June 6, 1933 |
| 1,971,338 | Contant | Aug. 28, 1934 |
| 1,971,816 | Hecht et al. | Aug. 28, 1934 |
| 2,023,593 | Hughes | Dec. 10, 1935 |
| 2,393,079 | Wall | Jan. 15, 1946 |
| 2,723,755 | Robinson | Nov. 15, 1955 |
| 2,726,645 | Cross | Dec. 13, 1955 |
| 2,964,024 | Kaufman et al. | Dec. 13, 1960 |

OTHER REFERENCES

Betz: "Handbook of Industrial Water Conditioning," fifth edition, 1957, published by Betz Laboratories, Philadelphia, Pennsylvania, pages 134–142 relied upon.

"Power" Magazine, March 1959, page 87, article "Water Treatment."

Water Conditioning for Industry, first edition, by Powell, published by McGraw-Hill Company, in 1954, page 269.